United States Patent [19]

Aulik et al.

[11] Patent Number: 4,959,240

[45] Date of Patent: Sep. 25, 1990

[54] POTATO-BASED FOODSTUFF

[75] Inventors: David J. Aulik, Channel Islands Harbor; Robert E. Christensen, Camarillo, both of Calif.

[73] Assignee: Horizons International Foods, Inc., Burlington, Mass.

[21] Appl. No.: 108,722

[22] Filed: Oct. 14, 1987

Related U.S. Application Data

[63] Continuation-in-part of Ser. No. 17,140, Feb. 20, 1987, abandoned.

[51] Int. Cl.$^5$ ...................... A23L 1/216; A23L 1/217
[52] U.S. Cl. .................................. 426/637; 426/656; 426/661; 426/658; 426/578; 426/808
[58] Field of Search ............... 426/637, 656, 661, 658, 426/578, 808

[56] References Cited

U.S. PATENT DOCUMENTS

| | | | |
|---|---|---|---|
| 3,396,036 | 8/1963 | Liepa | 426/637 |
| 3,925,563 | 12/1975 | Straughn et al. | 426/518 |
| 4,246,293 | 1/1981 | Larson | 426/637 |

*Primary Examiner*—Marianne Cintins
*Attorney, Agent, or Firm*—Kenyon & Kenyon

[57] ABSTRACT

Process for making novel foodstuffs from ingredients comprising potato materials and protein are disclosed. The novel foodstuffs produced by these processes are rapidly heated from a frozen state to a serving temperature in conventional heating equipment. The novel foodstuffs produced comprise a new french fry type foodstuff and a seafood analog. Also disclosed is a process to improve the formation of fiber from vegetable protein.

15 Claims, 2 Drawing Sheets

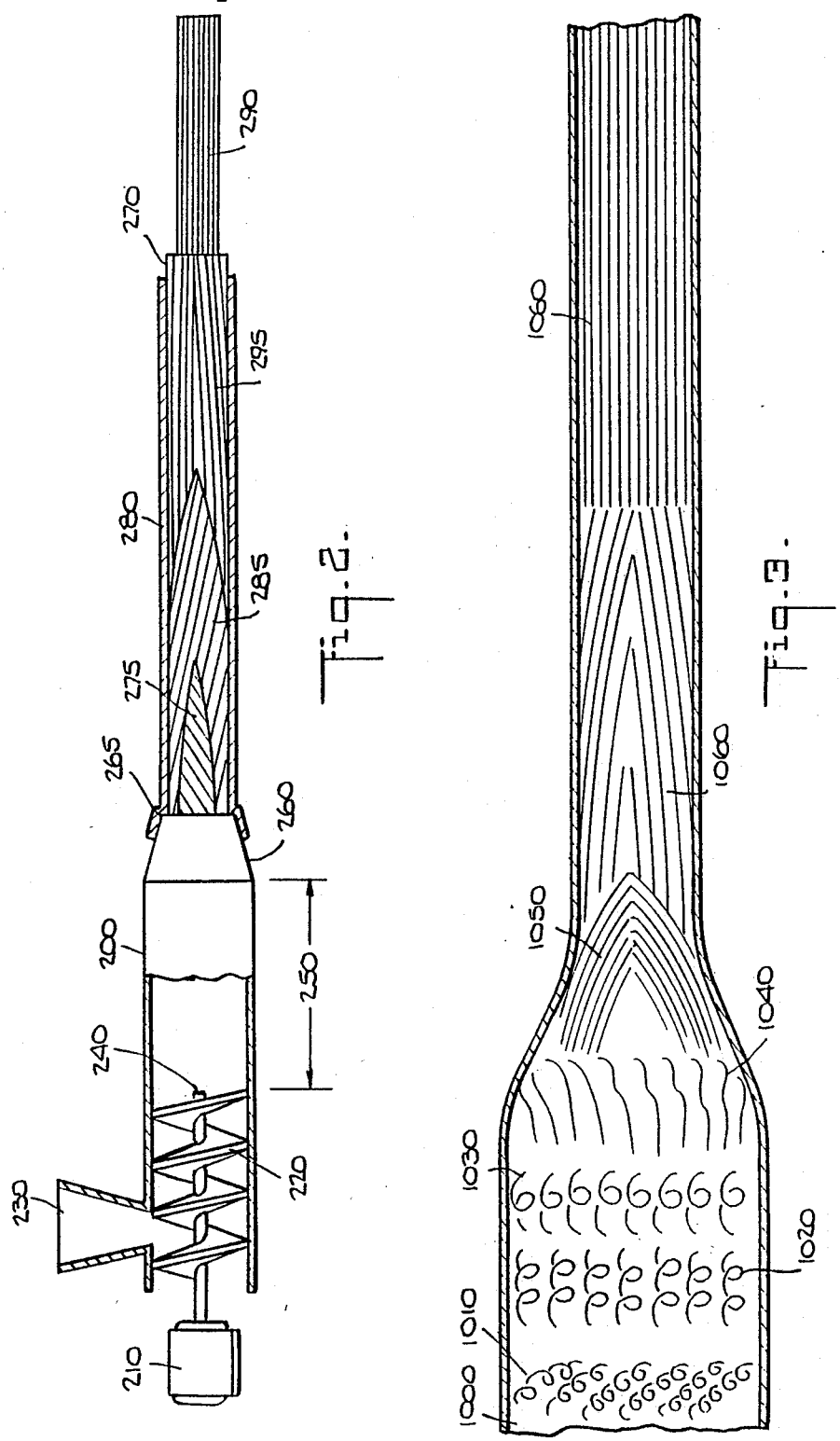

POTATO-BASED FOODSTUFF

FIELD OF THE INVENTION

This application is a continuation-in-part of application No. 017,140 filed Feb. 20, 1987, now abandoned. The invention relates to foodstuffs having a fibrous nature and methods for their production, and more particularly to potato-based foodstuff products having aligned fibers.

DESCRIPTION OF THE PRIOR ART

The food industry has developed many methods to produce various food products.

U.S. Pat. No. 4,246,293, issued on Jan. 20, 1981 to Larson, describes a process for preparing a potato snack product wherein whole potato pieces are combined with a protein additive into a substantially homogeneous mixture which is then fed into an extruder in which it is subjected to high temperature and pressure for a short period of time, producing an at least partially cooked product.

U.S. Pat. No. 3,849,582, issued on Nov. 19, 1974 to Blagdon et al., describes a fortified snack process and product wherein the product is produced by mixing a starch source, a starch modifier, a protein source not previously heat gelled, and water into a dough which is then shaped, preferably by extrusion under conditions that do not gel the protein, and fryed.

U.S. Pat. No. 3,692,531, issued on Sept. 19, 1972 to Heusdens et al., teaches a method of preparing a protein fortified vegetable product wherein a pregelatinized starch is mixed with a protein that has not been heat gelled and the mixture is shaped and heated to set the protein material.

U.S. Pat. No. 3,493,386 issued on Feb. 3, 1987 to Pyne describes a process for making a puffed fibrous foodstuff by frying a spun protein-starch fiber.

U.S. Pat. No. 3,396,036, issued on Aug. 6, 1968 to Liepa, discloses a potato food product created by mixing potato solids, milk solids, and water into a dough which can be fried immediately or stored.

U.S. Pat. No. 3,259,503, issued on July 5, 1966 to Tan et al., describes a method of making a puffed food product wherein potato starch is mixed with a flour and protein material to form a dough to which can be added food adjuncts such as nuts, fruit, vegetables and the like, as well as salt or other flavor additives; the dough is then shaped and cooked. An extruder with a heating chamber may be used to shape and cook the dough.

U.S. Pat. No. 3,021,224, issued on Feb. 13, 1962 to Stagmeier, describes a dehydrated potato product and process wherein cooked potato granules and water are combined to form a mash, to which a protein material may be added, the mash is extruded through a ricing apparatus resulting in strands which are rapidly dehydrated.

U.S Pat. No. 3,814,823, issued to Yang et al. on June 4, 1974, teaches a process for making a vegetable protein product intended to be a meat analogue, which analogue is stated to have fibers, by stretching a dough comprising protein and optionally carbohydrate in a process which has a Reynolds number of less than 2,000. The elongated dough is heat-setting either during or after the stretching step.

U.S. Pat. No. 3,886,299, issued to Feldburgge et al. on May 27, 1975, teaches a process for making a vegetable protein product intended to be meat analogue, which is stated to have fibers, by extruding a dough comprising protein and optionally carbohydrates at a low pressure (e.g., less than about 100 p.s.i.g.).

U.S. Pat. Nos. 4,125,635 and 4,346,652, issued on Nov. 14, 1978 and Aug. 31, 1982 respectively, both to deRuyter, teach extrusion processes for making a meat analogue which is stated to have curvi-linear aligned fibers. In the deRuyter processes, a dough comprising a vegetable protein and optionally carbohydrates is passed thorugh a screw conveyor that has an internal conveying section. The configuration of the internal conveying section changes in a manner effective to stretch the dough during its passage through the screw conveyor.

SUMMARY OF THE INVENTION

It has now been discovered that a new nutritious potato-based food product having improved eating qualities and a fibrous texture can be prepared by combining potato material with fibrous protein material. In one embodiment, a plastic mass is prepared by intimately mixing ingredients comprising an un-denatured protein, potato material and water. The resulting plastic mass is passed through a first passageway or relaxation chamber in a manner effective to relax the mixing tension in said plastic mass, wherein said relaxation chamber has a first cross-sectional area; thereafter, pushing said plastic mass through a second passageway having a decreasing cross-sectional area; and then pushing said plastic mass through a third passageway with a third cross-sectional area and applying sufficient heat to said plastic mass in the third passageway to first liquefy and then fix the structure of said plastic mass, resulting in a potato-based food product having aligned fibers.

It is an object of this invention to provide a nutritious potato-based foodstuff having fibrous texture.

It is a further object of the present invention to provide a nutritious, pre-cooked potato-based foodstuff which can be rapidly reheated from the frozen state in a conventional broiler, a microwave oven, or a convection oven.

Another object of the invention is to provide a method of preparing an improved french fry type foodstuff which can be rapidly heated from a frozen state to a serving temperature.

Another object of the invention is to provide a method of preparing a seafood analog which can be rapidly heated from a frozen state to a serving temperature.

These and other objects will become apparent from the following detailed description.

BRIEF DESCRIPTION OF THE DRAWINGS

FIG. 2 is a representation of an embodiment of an apparatus for carrying out the process of the present invention in a batch operation; and FIG. 3 is a representation of the changes in the configuration of the bundles of fibers of the product of the present invention as the plastic mass flow changes in the apparatus of FIG. 2.

DESCRIPTION OF THE INVENTION

Figure 1:
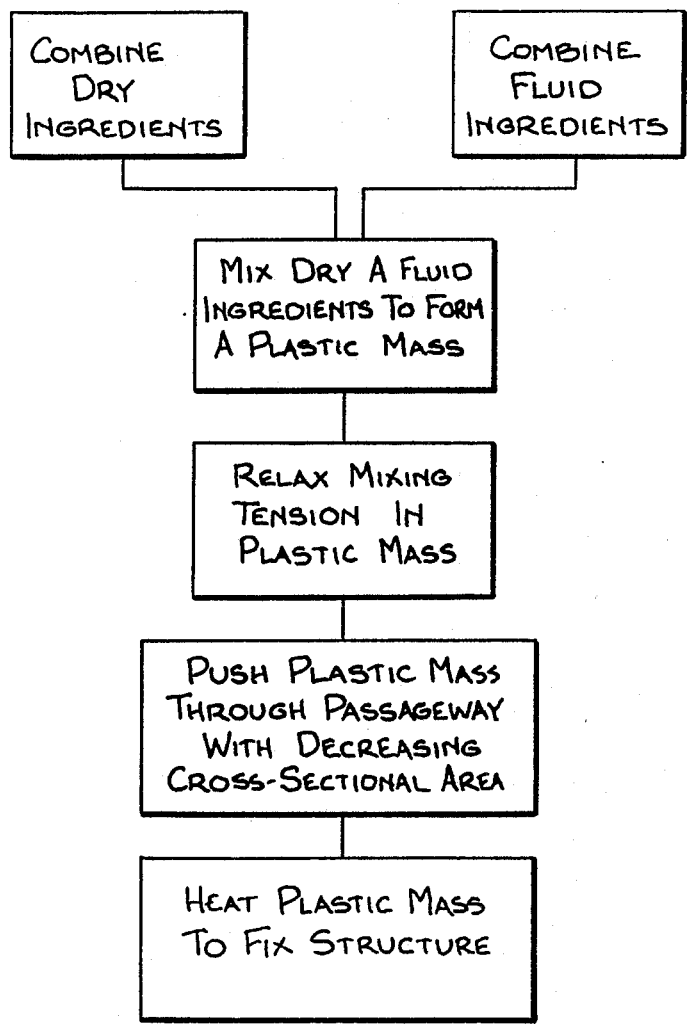
FIG. 1 is a simplified schematic representation of the process according to the present invention.

The fibrous protein material of the product of the present invention may be derived from any source, but it is preferred that the fibrous protein material is derived from vegetable sources. Typically, however, the fibrous protein material is not derived from potatoes. Preferred vegetable sources for the fibrous protein material are cereals, oil seeds and combinations thereof It is believed that the product of the present invention can be obtained by combining a fibrous protein material with a potato material in any manner. Thus, it is believed that a plastic mass comprising fibrous protein material and potato material can be injected into a mold and fixed in the resulting form. However, it is preferred that protein fibers are formed within a plastic mass comprising protein and potato material. In one embodiment, an un-denatured vegetable protein is combined with potato material in a manner effective to form a plastic mass which is processed through, in the following order, "piston-like" flow, differential flow and "plug" flow.

In the embodiments where the protein fibers are formed within the plastic mass, it is preferred that the source of protein contain proteins which will, under the mixing conditions utilized, yield protein fragments smaller than the initial proteins. It is further preferred that the source of protein contain protein which will, when mixed, yield protein fragments with a "molecular weight" of less than about 10,000 Daltons. Wheat gluten is a preferred source of un-denatured vegetable protein, and a particularly desirable source of protein is a wheat gluten which comprises between about 65 and about 80 percent, by dry weight (hereinafter, all percentages are by weight unless specified otherwise), protein; less than about 8 percent, lubricating material; and between about 10 and about 20 percent, carbohydrates. Additionally, the wheat gluten may also comprise moisture, preferably between about 3 and about 15 percent.

In practicing the process of the present invention, the plastic mass which is formed into the present nutritious potato-based foodstuff comprises an amount of fibrous protein material effective to impact the organoleptic and heat adsorption character of the product. Typically, the fibrous protein material adds a firmness to the product. It is preferred that the plastic mass which is formed into the potato-based foodstuff comprise between about 10 and about 45 percent protein. It is more preferred that the plastic mass comprise between about 10 and about 30 percent protein and it is still further preferred that the plastic mass comprise between about 12 and about 18 percent protein.

Any potato material may be used in forming the product of the present invention. It is preferred that the potato material used is derived from Russet Burbank, Norgold Russet, Norchip, Superior varieties and combinations thereof or similar potatoes which are high in starch and low in sugar. The potato material may comprise: potatoes which are freshly cooked in any conventional manner, potato skins, dehydrated potato, potato isolates such as potato starch and combinations thereof. Pressure cooking is a particularly useful conventional means of preparing freshly cooked potato material. Dehydrated potato granules are a typical form of dehydrated potato. When freshly cooked potato is used, it is preferred that prior to cooking the potatoes are fresh, firm and substantially free of sprouts.

The product of the present invention comprises an amount of potato material effective to impart a potato organoleptic quality to the resulting foodstuff. Preferably, the potato-based foodstuff comprises between about 6 and about 90 percent potato material. It is further preferred that, if the potato-based foodstuff simulates a known potato product, it comprises between about 20 and 80 percent potato material, and it is still further preferred that, if the potato-based foodstuff simulates a known potato product, it comprises between about 70 and about 80 percent potato material. However, if the potato-based fooodstuff is a seafood analog, it is further preferred that the foodstuff comprises between about 6 and about 20 percent potato material.

The lubricating component used in the plastic mass may be any material approved for use in food which reduces the friction between the plastic mass and the internal surfaces of the processing environment. The lubricating component may be added as an ingredient, or alternatively, the lubricating component may be coated onto the surface of the plastic mass. If the lubricating component is coated onto the surface of this plastic mass, it is preferred that this coating is preformed prior to the beginning of "plug" flow of the plastic mass. Oleaginous materials are useful lubricating components in the process of the present invention. The oleaginous material may be any lipid material which is approved for use in food products. It is preferred that oleaginous material used in the process of the present invention is a solid or a semi-solid at ambient temperatures. Vegetable oils, including hydrogenated and partially hydrogenated vegetable oils such as soy bean oil, sunflower oil, safflower oil, peanut oil, olive oil, corn oil, canola oil, animal fats (such as butterfat and beef tallow) and combinations thereof are particularly preferred oleaginous materials for use in the process of the present invention. These oleaginous materials are also useful for frying or par-frying the product. However, canola oil, soy bean oil, beef tallow and combinations thereof are especially preferred for frying or par-frying the product.

When a lubricating agent is used as an ingredient, it may either be added with the water, or before the water is added. If solid or semi-solid oleaginous materials are added to the dry mixture, these should be melted prior to addition in order to improve the homogeneity of the mixture.

When a lubricating component is used as an ingredient, generally about 2.5% and about 15% of the plastic mass is the lubricating component. It is preferred that between about 3.5 and about 10 percent of the plastic mass is lubricating component, when a lubrication component is used as an ingredient. It is further preferred that when a lubricating component is used as an ingredient the plastic mass comprises between about 3.5 and about 5 percent lubricating component.

In addition, the lubricating component may also be used as a carrier for an optional flavoring material.

When the lubricating component is added as a coating, the lubricating component coating will typically comprise about 2 percent of the coated plastic mass.

Alternatively, instead of or in addition to using a lubricating component, the processing equipment may be lined with a friction-reducing material such as Teflon.

Optionally, the potato-based foodstuff may also comprise non-potato derived starch materials, flavoring agents, thermal gelling agents, or a combination thereof.

The optional non-potato derived starch material may be from any source so long as it is present in amounts which do not detract from the potato-based foodstuff. It is preferred that at least a portion of any non-potato derived starch material in the plastic mass is heat gelatinizable and it is further preferred that at least a portion of the non-potato derived starch material is heat gelatinizable within the temperature range of about 80° to about 130° C. It is still further preferred that at least a portion of the non-potato derived starch material is heat gelatinizable in less than about 90 minutes when heated to between about 80° and about 130° C. Particularly preferred non-potato derived starch materials are heat gelatinizable within the temperature range of about 85° to about 110° C. and more particularly preferred non-potato derived starch materials are heat gelatinizable within the temperature range of about 95° to about 110° C.

Wheat flour, wheat starch, rice meal, rice starch, oat flour, soy flour, corn starch, modified corn starch and combinations thereof are examples of non-potato derived starch materials which are useful ingredients in the process of the present invention.

When included in the plastic mass used to form the potato-based foodstuff, non-potato derived starch materials are typically present at levels ranging from about 0 to about 30 percent. Preferably, in the formulation for a product which simulates a known potato product, non-potato derived starch materials are present in the plastic mass at levels ranging from about 0 to about 8 percent and more preferably at levels ranging from about 6 to about 8 percent, whereas in a formulation for a seafood analog, it is preferred that the non-potato derived starch materials are present in the plastic mass at levels ranging from about 6 to about 18 percent and more preferredly, from about 9 to about 15 percent.

The non-potato derived starch material is useful in improving the crispiness and/or crunchiness of the consumed product. However, some non-potato derived starch materials, such as rice meal, lead to shorter protein fibers. The non-potato derived starch materials which tend to result in shorter protein fibers are used at levels which do not significantly adversely affect fiber formation.

The optional thermal gelling agent may be any carbohydrate material which, as a 2 percent aqueous solution, gels within the temperature range of about 50° to about 90° C. It is also preferred that the viscosity of a 2 percent aqueous solution of the thermal gelling agent is between about 400 and about 4000 centipoise. While the preferred gel strength of the optional thermal gelling agent will vary with the product form such that for a french fry type product it is preferred that the optional thermal gelling agent has a soft gel structure and for a seafood analogue it is preferred that the thermal gelling agent has a firm gel structure. Methyl-cellulose (see 21 C.F.R. § 182.1480), hydroxypropylmethyl-cellulose (see 21 C.F.R. § 172.874), hydroxybutylmeyhul-cellulose and combinations thereof are all believed to be useful thermal gelling agents. Methocel A4C (a methylcellulose) and K4M (a hydroxypropylmethyl-cellulose) marketed by the Dow Chemical Company are particularly useful thermal gelling agents.

When incorporated into the plastic mass used to form the present potato-based foodstuff, the thermal gelling agent is typically present at levels ranging from about 0 to about 1 percent. Preferably the thermal gelling agent is used at levels ranging from about 0 to about 0.5 percent. It is further preferred that the thermal gelling agent is present in the plastic mass at levels ranging from about 0.1 to about 0.35 percent.

Thermal gelling agents are believed to improve the fiber forming properties of the protein material in the plastic mass.

The plastic mass also comprises water. Typically, the plastic mass comprises between about 30 and about 65 percent water. It is preferred that the plastic mass comprises between about 40 and about 60 percent water and it is more preferred that the plastic mass comprises between about 48 and about 58 percent water.

The water in the plastic mass is provided by two sources, the non-water ingredients and added water. It will be readily appreciated that the non-water ingredients comprise a varying amount of water depending on the ingredients used and their respective amounts. Freshly cooked potatoes may comprise a different amount of water than dehydrated potato granules. Therefore, the quantity of added water will be varied to compensate for the water content of the non-water ingredients. However, in any event, a quantity of water is added to the dry ingredients effective to hydrate any non-water ingredient which is not hydrated.

A particularly preferred source of added water is steep water produced as a by-product of cooking potatoes. As will be readily appreciated, some source of added water will have a mineral content which will adversely effect the organoleptic qualities of the resulting foodstuff. Thus, is is preferred that the added water does not adversely effect the product.

Flavor agents and/or flavor enhancers, such as potato flavor, cheese flavor, bacon flavor, sour cream flavor, seafood flavors including shrimp, crab, clam, lobster, oyster, crayfish and/or scallop flavors, autolysed yeast and combinations thereof or any other food flavoring additive, may also be used in the plastic mass. When flavor agents are used in the process of the present invention, they should be used at levels which do not inhibit fiber formation.

The plastic mass may comprise dietary fiber, as determined by the *Official Methods of Analysis* (1980) 13th Edition, Method 7.061-5, AOAC, Washington, D.C. However, it is believed the presence of more than about 4% dietary fiber in the protein source inhibits fiber formation. Thus, it is further preferred that the protein source used in the process of the present invention comprise less than about 4% dietary fiber.

In one embodiment of the process of the present invention, after a plastic mass is formed from the several ingredients, the mixing tension, including the kinetic energy, in the plastic mass is relaxed, the plastic mass is then elongated, liquefied and fixed. Preferably the process comprises, in the following order, "piston-like" flow, differential flow, and "plug" flow.

Un-denatured protein is mixed with freshly cooked potato and/or dehydrated potatoes, and with any other dry ingredients used such as rice meal, modified corn starch, methyl-cellulose, hydroxypropylmethyl-cellulose, hydroxybutylmethyl-cellulose, or combinations thereof. The dry mixing is preferably done at ambient temperatures, and is continued until a homogeneous mixture is obtained, usually less than about 30 minutes and typically in less than about 10 minutes.

Water, as needed to bring the total moisture to the desired level, is mixed with the dry ingredient admixture at ambient temperature, preferably at a temperature less than about 30° C., and more preferably at a temperature less than about 25° C., for a period of time sufficient to provide a plastic mass which looks like a bread dough. It is further preferred that the plastic mass has the following appearance and rheological characteristics: extensibility, cohesiveness, elasticity and a surface appearance which is translucent to opaque. It is still further preferred that, when stretched by hand, the plastic mass forms fibers. Typically, the combination is mixed for between about 5 and about 10 minutes and the initial mixing may be followed by a kneading step to improve homogeneity. Preferredly the wet mixing step is a low energy mixing and that the mixes plastic mass is substantially free of oil beads.

It is also preferred that the plastic mass is not overmixed. A plastic mass is beginning to be overmixed when it begins to be wet, sticky, fragile and have an "overmixed" or high sheen.

In one embodiment of the present invention, the dry ingredient admixture and water are both continuously fed, in metered proportions, into a first mixing chamber where the combination is mixed for approximately 10 minutes. Then, on a continuous basis, the mixed combination is transferred to a further mixing chamber wherein the mixed combination is further mixed by the action of a screw-feed mechanism which transports the plastic mass, while mixing it, into a relaxation chamber or quiescence zone.

In another embodiment of the present invention, the dry ingredients are blended in a first mixing chamber, the added liquid ingredients are added to the dry ingredient blend in a second mixing chamber where the admixture is mixed to form a plastic mass, which plastic mass is then transferred to a chamber where the plastic mass is kneaded.

While it is preferred that the plastic mass is further processed within about an hour of the completion of the first mixing step, it is more preferred that the plastic mass is fresh. If the plastic mass is held for an extended period of time after it is mixed, but before it is further processed, it is preferred that the plastic mass is kept at a temperature at or below ambient temperature. It is also preferred that the plastic mass is covered in a manner effective to prevent moisture loss.

Mixing a plastic mass comprising un-denatured protein may be sufficient to produce fibers. These fibers are aligned in the path of the mixing process. For example, a plastic mass coming out of a screw mixing apparatus will have fibers aligned in a helical, spiral or curvi-linear shape. See, e.g. deRuyter (U.S. Pat. Nos. 4,125,635 and 4,346,652).

In order to produce the linear fibers in the unexpanded foodstuff, the fibers, helical, spiral and otherwise and the kinetic energy in the plastic mass, both produced by the mixing process must first be relaxed. If the mixing tension from the mixing process is not sufficiently relaxed, then the aligned myofibrils, fibrils, fibers, and bundles of fibers of the product of the present invention are not obtained. It is necessary to relax this mixing tension sufficiently to permit the further processing to align the myofibrils, fibrils and fibers in a linear, parallel fashion. Typically, the mixing tension is relaxed sufficiently by pushing the plastic mass through a first passageway at a rate which provides the plastic mass with a sufficient residence time in the first passageway to relax at least some of the mixing tension. It is believed that a plastic mass formed by a high energy wet mixing process requires either a longer relaxation period than a plastic mass formed by a low energy wet mixing process or alternatively, the addition of a plasticizing agent.

In one embodiment of the present invention, the plastic mass is relaxed by pushing it at a substantially constant rate through a passageway in a manner effective to move substantially all of the plastic mass along a path substantially parallel to the internal walls of said passageway. Hereinafter, this embodiment is referred to as having "piston-like" flow. Thus, it is necessary that the fibers formed during the mixing be allowed to relax at least to the extent that the tight coils formed by the mixing process are not apparent in the relaxed plastic mass. A preferred means of relaxing the plastic mass is to push said plastic mass through a smooth bore passageway so that the plastic mass has a residence or quiescence time in the passageway effective to observably relax the mixing tension then present in the plastic mass. Typically, the plastic mass is pushed through the process with a pressure of less than about 85 p.s.i.g. While a potato-based foodstuff with aligned protein fibers can be obtained when the pressure is between about 75 and about 100 p.s.i.g., the fiber quality is improved when lower pressures are used. It is preferred that the pressure in the third passage way is less than about 75 p.s.i.g. and it is further preferred that the pressure in the third passageway is less than about 50 p.s.i.g. It is still further preferred that the pressure pushing the plastic mass is approximately constant once the process reaches a "steady-state".

It is also preferred that the plastic mass has a relaxation chamber residence time of at least about 5 minutes, and more preferably, a relaxation chamber residence time of at least about 15 minutes. It is also preferable that the relaxation or quiescence zone or passageway section has a constant cross-sectional area.

Subsequent to relaxing the mixing tension, the plastic mass is elongated in a manner sufficient to align at least some of the fibers. Preferably the plastic mass is elongated in one dimension without a significant volumetric expansion. It is further preferred that the plastic mass volume remains less than about 125% of its initial volume, as measured after mixing, and it is more preferred that the volume remains less than about 112% of the initial volume, as measured after mixing.

In contrast to the lack of a significant volumetric expansion, it is preferred that the plastic mass is elongated so that the elongated product has a length in one dimension which is at least 300% of the initial length of the plastic mass in this dimension. More preferably, the plastic mass is elongated so that the product has a length of at least about 400% the initial length.

A preferred means of elongation is by pushing the plastic mass with a force applied substantially uniformly, in a substantially single dimension, through a passageway having a decreasing cross-sectional area i.e. a converging section. It is further preferred that the converging section cross-sectional dimensions are decreased by at least one inch in each direction of the cross-section, and it is still further preferred that the taper of the converging section is such that the cross-section dimensions decrease by less than about one inch for each ten inches of the converging section. Preferably the passageway has a smooth bore.

The cross-sectional shape of each passageway affects the formation of the product. In at least the continuous process embodiments, it is believed that a passageway having a cross-sectional shape between a square and a circle wherein each side of a cross-sectional plane of the passageway normal to the direction of the plastic mass flow has an approximately equal length, produces fibers with a circular cross-section. In contrast, a passageway having substantially unequal sides is believed to produce fibers with a linear cross-section (sheetlike fibers). Thus, while the passageways may have cross-sectional shapes which are round, triangular, elliptical, square, rectangular, star-shaped, trapezoidal or of any other polygon, it is preferred that the cross-sectional plane (i.e. the plane normal to the direction of plastic mass flow) of each passageway is an approximately equal sided polygonal.

It should also be noted that all of the passageways need not have the same cross-sectional shape, and that the third passageway may have more than one cross-sectional shape. Thus, for example, the first passageway may have a round cross-sectional shape, the third passageway may have a rectangular shape, and the intervening second passageway, the passageway with the decreasing cross-sectional area, will have a cross-sectional shape which changes from a round cross-section shape at the end that abuts the first passageway to a rectangular shape at the end which abuts the third passageway. While substantially the total length of abutting passageways may have different cross-sectional shapes, each of the ends of abutting passageways must have the same cross-sectional shape and area. When the passageway with the decreasing cross-sectional area has different cross-sectional shapes at each end, then this passageway is sometimes also referred to herein as a dough reformer.

Additionally, in the embodiments of the present invention in which the elongated, fibrous material formed from the plastic mass is heat set in-line with the elongation step, the cross sectional shapes of the passageway wherein the elongated, fibrous material is heat set, i.e. in the third passageway, may be changed without affecting the fiber cross-sectional shape. It is preferred that any change in the cross-sectional shape of the third passageway occurs prior to the point in the process where "plug" flow begins.

It is necessary that the aligned fibers, fibrils and myofibrils are fixed after the elongation step but before the mixing tension of the aligned bundles of fibers is relaxed. The length of time required to relax the mixing tension at this stage varies. It has been noted that products in passageways having a greater surface area per unit volume of the elongated, fibrous material retain the mixing tension longer and can therefore be held for a longer period of time before fixing. Nonetheless, it is preferred that the aligned fibers, fibrils and myofibrils are fixed within about 60 minutes after the plastic mass is elongated.

The elongated, fibrous material is fixed by a thermal processing step wherein sufficient heat is applied to elongated, fibrous material to elevate its temperature to a temperature sufficient to prevent the elongated, fibrous material from relaxing into a nonfibrous condition. The source of the heat used to fix the elongated, fibrous material may be any type of heat such as convection heating, conduction heating, infra-red radiation, microwave radiation, steam injection or a combination thereof. It is preferred that the elongated, fibrous material is heated to between about 85° and about 120° C. for between about 10 and about 90 minutes to fix said elongated, fibrous material. It is more preferred that the elongated, fibrous material is heated to a temperature between about 85° and about 110° C. for between about 10 and about 60 minutes, and it is further preferred that the center of the elongated, fibrous material is heated to about 95 to about 108° C. for between about 15 to about 45 minutes without overheating the edges of the elongated fibrous material, and most preferably, the center of the elongated, fibrous material is heated to a temperature of about 100° C. for between about 25 and about 40 minutes. Once fixed, the fibers will not revert into a non-fibrous plastic mass when allowed to stand.

In some embodiments of the process of the present invention, the thermal processing is carried out in two stages to improve the through-put of the apparatus.

The source of the elevated heat applied to the elongated, fibrous material may be provided by any conventional heating means including convection heating, conduction heating, infra-red radiation, microwave radiation, steam injection, or any combination thereof.

That part of the apparatus in which the thermal processing step is carried out is referred to herein as an oven. The oven may be in-line with the elongating part of the apparatus, and thus a continuous step, or the oven may be out-of-line. If the oven is not in-line, then the passageway containing the elongated fibrous material is removed and transferred to the oven. After thermal processing, the product is removed from the passageway and the empty passageway is returned to concentric alignment with the elongating section of the apparatus. It is preferred that the removable passageway is a segment of the third passageway and is located a sufficient distance from the beginning of the third passageway so that the removable passageway section begins after the differential flow phase is completed and before the "plug" flow phase has begun. It is further preferred that the removable passageway section is located at least about 50% of the transitional distance from the end of the differential flow to the beginning of the "plug" flow, and more preferably less than about 90% of said transitional distance.

It is preferred that the product, after thermal processing, has a final moisture content of between about 75 and about 95 percent of the moisture initially present in the plastic mass.

When the elongated fibrous material is thermally processed at a temperature of about 106° C. for about 30 minutes, fibrils are believed to have a substantially uniform starch coating. It is preferred that the thermal processing temperature is above that necessary to plasticize the starch present in the dough and below that effective to rupture the starch granules.

The plastic mass may be heated up to between about 60° and about 85° C. prior to elongation.

It is also preferred that the elongated plastic mass is heated to between about 25° and about 15° C. less than the final thermal processing temperature to reduce its viscosity and liquefy the starch without causing the starch to gel. Typically the elongated plastic mass is heated by applying an external source of between about 60° and about 95° C. heat to the exterior of the third passageway abutting the elongation passageway.

The potato-based foodstuff of the present invention, as formed and before optional further processing, may look like a rope or tow of fibers. Additionally, the tow may have a "skin" or non-fibrous sheath coating the surface of the tow. Upon further examination with the unaided eye, it is apparent that, under the "skin", the tow is comprised of a plurality of bundles of fibers. The bundles of fibers in the tow appear to run the entire length of the product. The product is a composite of parallel bundles and each bundle in turn is a composite of parallel fibers. While the fibers are linear and have the appearance of running the entire length of the tow, in fact, it is believed that any length of each fiber may actually be between about 1 cm and about 20 cm.

It is believed that microscopic examination will reveal that each fiber is comprised of a plurality of aligned fibrils, and each fibril is, in turn, comprised of myofibrils. The inner core of the myofibrils is believed to be substantially proteinaceous. This core is believed to comprise polymerized protein fragments which have been aligned and is believed to form a new "protein". It is believed that these protein fragments are polymerized to form this new "protein" when these fragments are subsequently aligned. Surrounding this proteinaceous core it is believed is a protein-carbohydrate complex which may comprise other components such as dietary fiber and minerals, and which is believed to promote structural stabilization by the formation of a prolific number of hydrogen bonds between the various components. The protein-carbohydrate complex is believed to be comprised of between about 60 to about 90% proteinaceous material and between about 10 and about 40% starch and other carbohydrates. Finally, the outer layer of the myofibril is believed to be comprised of at least about 90% gelatinized starch.

The length of a tow of the product is normally determined by criteria other than conditions necessary to practice the present invention, such as the means employed to remove the tow. Unless the tow is cut, the tow will be a long, continuous mass, i.e. an extended rectangular prism, ending only when the dough available to the process is consumed. Upon exiting the apparatus, the tow has the shape of the exit orifice of the apparatus.

The non-fibrous sheath or skin which coats the tow produced in practicing the present invention can vary greatly in thickness. It is now believed that the skin results from overheating the surface of the plastic mass and/or from surface shear. By controlling the heating process, the passageway alignment and the frictional coefficient of the passageways, a thin, uniform skin is obtained. It is preferred that the product has a skin with a thickness of less than about 1 mm and, more preferably, a skin less than about 0.5 mm.

In one embodiment of the process of the present invention, after pushing the plastic mass through (a) the first passageway with a "piston-like" flow in a manner effective to relax the mixing tension present in the plastic mass sufficiently to prevent the mixing tension from effecting the product and (b) the passageway with a decreasing cross-sectional area to elongate the plastic mass, the elongated plastic mass is pushed through the third passageway with a differential flow. As the elongated plastic mass is pushed through the third passageway, it is heated. When the elongated plastic mass is heated by a convectional means, at the point along the path of travel through the third passageway where substantially all of the elongated plastic mass has reached a transitional temperature, the flow characteristics of the elongated plastic mass change and the differential flow is replaced by a transitional type of flow. It is believed that this flow change transitional temperature generally corresponds to the gelatinization temperature range of the plastic mass. This flow change temperature range is typically between about 85° and about 130° C. As the elongated plastic mass continues down the third passageway, it is kept at the same temperature, or preferably, further heated. Thereafter, the elongated plastic mass flow changes to a "plug" flow. If the plastic mass does not comprise a sufficient amount of the lubricating component at the point where the flow becomes a "plug" flow or alternative means of reducing friction, the friction between the inner surfaces of the third passageway and the elongated plastic mass disrupt the formation of a product with aligned fibers. However, coating a lubricating component onto the surface of the elongated plastic mass before, or at about the point where the flow becomes "plug" flow can reduce this friction and permit the production of the aligned fiber product. Preferably, any lubricating component used to coat is injected onto the elongated plastic mass prior to the beginning of "plug" flow.

While "aligned" bundles of fibers exist within the elongated plastic mass during the differential flow in the third passageway, the "aligned" bundles of fibers are aligned only to a limited extent and are not aligned throughout the product. The fibers typical of the product of the present invention are aligned throughout the product during the transitional flow phase of the plastic mass' passage through the third passageway.

While the viscosity of the plastic mass changes during the process of the present invention, and most markedly, when the flow character of the mass changes, the plastic mass has a viscosity in the range of about 104 to about 106 centipoise. Thus, the minimum viscosity of the dough in the process of the present invention is at least about $10^4$ centipoise.

Consequently, the Reynolds number is between approximately $10^{-7}$ and approximately $10^{-5}$. Thus, it is preferred that the Reynolds number is significantly less than about 1. However, it is important that if the product to be made by pushing the plastic mass through the relaxation chamber into a section having a decreasing cross-sectional area and then into a third section that the flow of said plastic mass, in addition to having a Reynolds number less than about 1, is highly laminar and piston-like. It is also important that the several passageways through which the plastic mass travels are substantially concentric during the plastic mass travel through said passageways. This flow path through concentric passageways is in contradistinction to a helical or other type of path. The path the plastic mass travels may be a converging linear path as the plastic mass travels through the passageway having a decreasing cross-sectional area, or as it is otherwise reformed and/or elongated.

It is relatively unimportant as to whether the driving force applied to move the plastic mass through the process is a directly pushing force, such as a piston or a screw feeder positioned before the relaxation chamber, or alternatively the force is a pulling force such as that exerted by a reduced pressure created at the end of the process by a vacuum pump. For convenience, any force used to move the dough in the process of the present invention shall be referred to herein as a pushing force.

If so desired, the potato-based foodstuff may be further processed. The further processing may be to enhance the products' taste, nutritional value, or both, or for other purposes. Further processing steps may comprise enrobing the product with food approved material, frying, injecting the product with material approved for use in foods, or a combination thereof.

In one embodiment of the present invention a french fry type food is made from the potato-based foodstuff. After being heatset in the thermal processing step, the potato-based foodstuff "rope" may be in the shape of an extended, rectangular prism. This prism is pneumatically cut into smaller rectangular prisms, each between 2.5 and 4 inches long and having a ¼ inch square cross-section.

These smaller prisms can be then treated according to any further desired processing steps. Typically, these smaller prisms are treated in a manner effective to crispen the superficial portion of the prisms and/or to create a desired color on the surface of these prisms.

For example, these smaller prisms can be immersed in an oil bath. The temperature of the oil bath is typically about 190° C., the oil is typically a 500 AOM oil such as a hydrogenated soybean oil, a Canola oil, beef tallow or a combination thereof and the immersion is typically for less than about 90 seconds.

In processing the prisms to develop a surface color, it is preferred that the color development is effective to produce a color between about 0.0 and about 2.0 on the U.S.D.A. Munsell French Fry color chart and more preferably, a color between about 0.5 and about 1.5.

It is preferred that the oil of the oil bath does not impart any undesirable organoleptic character to the product and that any oil absorbed into the product is stable throughout the shelf life of final product. It is also preferred that the oil bath immersion is for about 15 to about 50 seconds. It is further preferred that the oil bath immersion of the smaller prisms is effective to develop the surface color in the prisms close to about 1 on the U.S.D.A. Munsell French Fry color chart. When these prisms are heated in an oil bath, they do not puff. In fact, at least some prisms, when heated in an oil bath, develop concave surfaces.

After immersion in the oil bath it is preferred that any superficial oil on the smaller prisms is removed by any convention means, such as contact with an absorbent material or an air stream.

Alternatively, the superficial crispness and/or color of these prisms can be generated by other means, alone or in combination with an oil bath immersion. When an other means is used in combination with the oil bath immersion, typical the oil bath immersion is for less than about 40 seconds and this immersion is preferredly for less than about 30 seconds.

One alternative means of creating superficial crispness, alone or in combination with an oil bath immersion, is to coat the smaller prisms with a food approved material which, when exposed to heat, forms a layer which, when bitten, is perceived as crisp. This means may be accomplished by coating the smaller prisms in any convention manner with an aqueous solution / suspension of a modified food starch such as a tapioca or corn starch. Typically, the solution/suspension contains betweem about 2 and about 5 percent starch.

The product may be consumed at this point in a manner analogous to a conventional french-fry, or it may be further processed to provide for long term storage. Thus, alternatively, these prisms may be frozen by any convention means and preferably by a quick freezing method.

The frozen prisms may be heated by any conventional means of heating frozen french fries. It is preferred that these frozen prisms are heated in a broiler, in a convection oven or in a microwave oven. Typically, a single serving (3.5 ounces) portion of these prisms frozen to a standard frozen food temperature, i.e. −20° to 0° C., may be reheated from a frozen state by either a conventional broiler or a (400 to 1000 Watt) microwave oven in less than about 2 minutes, preferredly in less than about 90 seconds and more preferredly in less than about 60 seconds.

In another embodiment of the present invention, the heat-set potato-based foodstuff is sliced thinly and processed in a manner analogous to conventional potato chip processing.

In a further embodiment of the present invention, the heatset potato-based foodstuff is sliced to about 4 mm thick, topped with a conventional flavoring composition and baked to a moisture of less than about 6 percent.

In a product which resembles seafood, such as crab meat, clam meat, lobster meat, oyster meat, shrimp meat or scallop, the product may be consumed as cut pieces which exit from the thermal processor, or they may be processed further. For example, the seafood analog may be breaded, fried, baked, frozen or a combination thereof.

FIG. 2 depicts one embodiment of the apparatus used in the process of the present invention. This batch process apparatus comprises a drive means 210 for screw feed 220 in passageway 200. A plastic mass is fed into the apparatus batch-wise through hopper 230 and enters passageway 200 where the plastic mass is driven forward by screw feed 220. Screw feed 220 terminates at point 240 which abuts quiescence zone 250, which is also located within passageway 200. The continued addition of plastic mass to the quiescence zone 250 by the action of the screw feed mechanism 220 forces the plastic mass through at least the section of the quiescence zone 250 distal to the screw feed 220 in a manner which resembles the flow produced by a piston. Next, the "piston-like" flow of plastic mass exits quiescence zone 250, and enters, and flows through the abutting conical constriction 260 which elongates the plastic mass. The smaller end of conical constriction passageway 260 abuts the smooth bore cylindrical passageway 270. It should be noted that the internal diameter of passageway 200 and the internal diameter of the larger end of conical constriction 260 are equal and larger than the internal diameter of smooth bore passageway 270 and the smaller end of conical constriction 260. Also, the internal diameter of smooth bore passageway 270 and the smaller end of conical constriction 260 are equal.

Along the external surface of the quiescence zone 250, conical constriction passageway 260 and smooth bore cylindrical passageway 270 is situated a heating apparatus 280 which is used to heat the plastic mass as it passes through these passageways. Thereafter the product 290 exits from the end of smooth bore cylindrical passageway 270 distal to conical constriction passageway 260.

In this embodiment of the present invention, the flow of the plastic mass in area 275 is differential flow in area 285 is transitional, and in area 295 is "plug."

While not wishing to be bound by any theory, it is believed that the mixing phase breaks down at least some of the high molecular weight proteins (e.g., wheat gluten comprises glutenins and gliadins, proteins which have a molecular weight of at least about 40,000 Daltons) into lower "molecular weight" protein fragments (e.g. protein fragments with a "molecular weight" of less than about 10,000 Daltons, and preferably less than about 5,000 Daltons). One result of the fracturing of the original proteins into smaller fragments is believed to be a reduction in the secondary and tertiary globular structure of the original proteinaceous material. Instead, the plastic mass, after this fracturing, comprises protein fragments which can be substantially aligned in a substantially linear fashion. It is further believed that when these protein fragments are substantially aligned, they interact and polymerize. It is believed that this polymerization can be measured by an increase in the mass of the insoluble fraction when the product is analyzed by the fractionation procedure of Feillet, P., et al., *Modifications in Durum Wheat Protein Properties Durino Pasta Dough Sheeting,* Cereal Chemistry, 54(3), 580–7, 1977, which is hereby incorporated by reference.

This polymerization is believed to help stabilize the new structure. The presence of a salt may also further stabilize this structure by creating additional cross-links. Hydrogen bonding between the carbohydrate materials and the "new protein" polymer is also believed to contribute to the stabilization of the product.

It is also believed that during the thermal processing step, the gelatinizable starch and any thermal gelling agents present in the plastic mass adsorb water and is liquefied. This liquefied plastic mass permits the protein fragments to move about, align themselves, and polymerize. However, if the plastic mass is heated to too high a temperature, the starch granules rupture, which precludes the liquefaction. It is believed that this liquefaction facilitates the formation of the aligned protein fragments. If the plastic mass is not heated sufficiently, the mass is not sufficiently liquefied

EXAMPLE I

A plastic mass is formed from the following ingredients, in the proportions indicated by the listed weight percentages:
50% fresh cooked potatoes
18% dehydrated potato granules
15% wheat gluten
11% water added
5% soy bean oil The fresh cooked potatoes, the wheat gluten and the potato granules are mixed together until a homogeneous mixture is obtained. The mixing is carried out at about 25° C. for about 25–30 minutes. The water and soy bean oil are then added and all the ingredients blended for about 5–10 minutes into a uniform, elastic plastic mass.

The water used as an ingredient is taken from the water used to cook the fresh potatoes.

EXAMPLE II

A plastic mass is formed substantially as in Example I, except that the amount of potato granules is reduced to 13%, with 5% of the plastic mass comprising rice meal #2.

EXAMPLE III

A plastic mass is formed using the following ingredients in the following weight percentages:
53% water
28.3% dehydrated potato granules
13% wheat gluten
5% corn oil
0.35% autolyzed yeast
0.35% potato flavor The wheat gluten, potato granules, yeast and potato flavor are mixed together for about 20 minutes, until a homogeneous mixture is formed, at about 25° C. Then the soy bean oil is mixed into this dry admixture and the water is added. The resulting combination is blended for about 5 minutes until a uniform, elastic plastic mass is formed.

EXAMPLE IV

A plastic mass is formed substantially as in Example VI except that only 20.8% potato granules are used, with 7.5% of the plastic mass comprising rice meal #2. The rice meal is included with the other dry ingredients in the first mixing step.

EXAMPLE V

A plastic mass is formed from the following ingredients:
55% water
21.65% dehydrated potato granules
3% wheat gluten
7.5% rice meal #2
2% soy bean oil
0.35% autolyzed yeast
0.35% potato flavor
0.15% hydroxypropylmethyl cellulose The hydroxypropylmethyl cellulose ("Methocel K4M") is a product of Dow Chemical Company.

The potato granules, rice meal, wheat gluten, Methocel, yeast and potato flavor are mixed for about 5 minutes until a homogeneous mixture is obtained. This is done at a room temperature of about 25° C. The oil and water are then combined with the dry mixture and the combination is blended for about 10 minutes until a uniform, elastic plastic mass is formed.

EXAMPLE VI

A plastic mass is created from the following ingredients:
57% water
21.6% dehydrated potato granules
7.5% rice meal #2
13% wheat gluten
0.2% Methocel K4M
0.35% yeast
0.35% potato flavor All ingredients except water are mixed together for about 15–20 minutes, forming a homogeneous mixture. The water is then combined with this dry mixture and blended for about 5 minutes, until a uniform, elastic plastic mass is formed. All these operations are conducted at a temperature of about 25° C.

EXAMPLE VII

A plastic mass is formed substantially as in Example IX, with one difference: the Methocel is replaced by 0.2% more potato granules, for a total of 21.8% potato granules in the dough.

EXAMPLE VIII

In a first fry mixer, 1.55 parts of gluten, 0.2 parts Methocel K4M, and 0.25 parts yeast are blended to form a homogeneous first dry ingredient admixture.

In a second dry mixer, 13.95 parts gluten, 20.0 parts dehydrated potato granules and 6.5 parts rice meal are blended to form a homogeneous second dry ingredient admixture.

In a holding tank, 53 parts water are homogeneously mixed with 0.35 parts potato flavor.

The first and second dry ingredient admixtures are both fed into a vibratory mixer at the rate of 2 parts of the first admixture for each 40.65 parts of the second admixture. These dry ingredient admixtures are blended in the vibratory mixer in about 3 to 4 minutes into a uniform admixture. The vibratory mixer transports the dry ingredient admixture to a twin screw low energy mixer where 4 parts corn oil are sprayed onto each 42.65 parts of the uniform combined dry ingredient admixture as an air atomized mist. Thereafter, 53.35 parts of the aqueous potato flavor solution are sprayed onto each 46.65 parts of the oil and dry ingredient admixture as the oil and dry ingredient admixture is fed through the twin screw mixer which turns at a rate of 11.5 rpm. The combination of the oil, water and dry ingredient admixture is then mixed in the twin screw mixer to form a homogeneous plastic mass.

As the homogeneous plastic mass exits the mixer, it falls into the hopper of a (Hobart) screw feed device which pushes the plastic mass into a four inch diameter, 2 foot long, Teflon lined cylindrical relaxation chamber. The continuous addition of plastic mass to the relaxation chamber forces the plastic mass to flow through the relaxation chamber with a "piston-like" flow. However, during start-up, the addition of the plastic mass to the screw feed device is monitored and any build up of the plastic mass is removed until product begins to exit the thermal processing section.

The plastic mass is then forced through a 30 inch long, Teflon lined, converging section whose end which abuts the relaxation chamber has a circular cross-section with a four inch diameter and another end which has a 1 inch by 3 inch rectangular cross-section. The transition of the converging section cross-section from circular to rectangular is as gradual as possible over the entire length of the converging section.

Prior to entering the converging section, the plastic mass is at an approximately ambient temperature. The external surface of the converging section is heated to approximately 75° C., which heats the plastic mass within the converging section.

The plastic mass is pushed out of the converging section and into a 25 foot long Teflon lined thermal processing section with a 1×3 inch rectangular cross-section. In the 5 feet of the thermal processing section abutting the converging section, the exterior of the thermal processing section is heated to between about 90° and about 100° C. In the remaining 20 feet of the thermal processing section, the exterior of the thermal processing section is heated to between about 102° and about 106° C.

A potato-based foodstuff exits the thermal processing section at a rate of about 55 lbs. per hour.

EXAMPLE IX

The potato-based foodstuff of Example VIII is made into a frozen shoestring french fry type product by cutting the Example VIII foodstuff into the desired shape, coating the cut material with an aqueous starch dispersion, frying or par-frying the starch coated material, removing the superficial oil from the fried material, and freezing the product.

Specifically, the Example VIII foodstuff is cut, variably, into 2.5 to 4 inch prisms having a ¼ inch square cross-section and shaken to separate. These prisms are then immersed for about 25 seconds into a 4 percent corn starch dispersion to coat the prisms.

The corn starch dispersion is formed by slowly adding 4 parts corn starch to 90.85 parts 76° C. water with mixing. This combination is simmered for about 15 minutes and then cooled to about 76° C. After cooling to 76° C., 0.15 parts emulsifier is added with mixing and then 5 parts of corn oil are added with mixing.

After being coated, the prisms are heated to between about 230° and about 260° C. to dry any excess starch dispersion. During this drying, the prisms are turned to dry the prisms evenly.

The coated prisms are then immersed in a fryer continuing 190° C. Canola oil for about 23 seconds. After the prisms are removed from the fryer, the excess oil on the prisms is blown off with an air stream. After removing the excess oil, the prisms are quick frozen in a liquid Nitrogen cooling tunnel in about 3 to 4 minutes. The frozen product is packaged and stored frozen until removed from the freezer and reheated, at which point they are ready for consumption as a french fry type foodstuff.

EXAMPLE X

A 3.5 ounce portion of a commercial, frozen, microwavable french fry (Ore Ida brand) was heated for 4 minutes in a conventional microwave oven. The commercial frozen, microwavable french fry was compared to a similar amount of a product similar to the product of Example IX which reheated for 1 minute in the same microwave oven at the same setting approximately 600 Watts). When placed in the microwave, both products were frozen. While both products were characterized as hot french fries, the product similar to Example IX french fry was considered to be crispier and cruncher.

While the product similar to Example IX french fry has a texture and an external appearance (i.e. that of its surface portion), including shape and color, similar to that of a conventional French fry, the product similar to Example IX french fry has an internal visually discernible skeletal structure (e.g. aligned fibers).

EXAMPLE XI

A 3.5 ounce portion of a commercial, frozen, broiler heatable french fry (Ore Ida brand) was heated for 14 to 18 minutes in a conventional broiler. This heated commercial french fry was compared to a similar amount of a product similar to the product of Example IX which had been reheated for 1 minute in the same broiler. When placed in the broiler, both products were frozen. Both products were judged to be comparable.

EXAMPLE XII

A 3.5 ounce frozen portion of a product similar to the Example IX french fry type product was heated for about 5 minutes in a toaster oven set at about 245° to 260° C. The product was judged to be a crisp/crunchy, hot french fry.

EXAMPLE XIII

A seafood analog is formed by first making a plastic mass comprising 0.2 parts Methocel A4C, 12 parts modified corn starch, 12 parts dehydrated potato granules, 15 parts gluten, 50 parts water and an effective amount of a seafood flavoring selected from the group of seafood flavors composed of shrimp, crab, clam, lobster, oyster, scallop, and combinations thereof. The plastic mass is relaxed, elongated, liquefied and then fixed into a material having aligned fibers which resemble seafood meat.

This seafood analog can then be either frozen, breaded, fried, baked or a combination thereof to yield a rapidly heated foodstuff having the appearance, texture and taste of seafood formed from vegetable materials.

What we claim is:

1. A foodstuff comprising:
   (a) between about 10 and about 45 percent of a fibrous non-potato vegetable protein having aligned bundles of fibers;
   (b) between about 6 and about 90 percent of a nonfibrous potato material.
2. A foodstuff according to claim 1 which further comprises:
   (a) an appearance similar to that of a french fry; and
   (b) a texture similar to that of a french fry.
3. A french fry type foodstuff comprising:
   (a) between about 10 and about 45 percent of a fibrous non-potato vegetable protein having aligned bundles of fibers;
   (b) between about 20 and about 80 percent of a potato material;
   said foodstuff having a color between about 0.0 and about 2.0 on the Muncell scale.
4. A heated foodstuff according to claim 3.
5. A foodstuff comprising:
   (a) between about 10 and about 45 percent fibrous non-potato vegetable protein having aligned bundles of fibers;
   (b) between about 20 and about 80 percent potato material;
   said foodstuff upon subsequent cooking having a surface portion and an interior portion wherein the texture of said interior position is substantially less firm than the texture of said surface portion.
6. A foodstuff according to claim 5 which further comprises an appearance similar to that of a french fry.
7. A foodstuff according to claim 5 which further comprises non-potato derived starch material.
8. A foodstuff according to claim 5 which further comprises a thermal gelling agent.
9. A heated foodstuff according to claim 5.
10. A foodstuff comprising:
    (a) between about 10 and about 45 percent fibrous non-potato vegetable protein having aligned bundles of fibers;
    (b) between about 20 and about 80 percent potato material;
    (c) said foodstuff having an appearance similar to a French fry and an internal visually discernible skeletal structure.
11. A foodstuff according to claim 10 wherein at least about 50 percent of said potato material is ungelatenized.
12. A foodstuff comprising:
    (a) between about 10 and about 45 percent fibrous non-potato vegetable protein having aligned bundles of fibers;
    (b) between about 6 and about 20 percent potato material;
    (c) between about 6 and about 18 percent non-potato derived starch material;
    (d) between about 30 and about 65 percent water; and
    (e) an effective amount of a seafood flavoring agent.
13. A foodstuff according to claim 12 which further comprises a texture similar to that of seafood.
14. A foodstuff according to claim 12 which further comprises a thermal gelling agent.
15. The foodstuff of claims 1, 3, 5, 10 or 12 wherein said fibrous non-potato vegetable protein comprises wheat gluten.

* * * * *

UNITED STATES PATENT AND TRADEMARK OFFICE
CERTIFICATE OF CORRECTION

PATENT NO. : 4,959,240

DATED : September 25, 1990

INVENTOR(S) : Aulik et al.

It is certified that error appears in the above-identified patent and that said Letters Patent is hereby corrected as shown below:

Column 1, line 29, delete "fryed" and substitute therefor --fried--.

Column 5, line 52, delete "hydroxybutylmeyhul-" and substitute therefor --hydroxybutylmethyl--.

Column 6, line 25, delete "effect" and substitute therefor --affect--.

Column 7, line 5, delete "Preferredly" and substitute therefor --Preferably--.

Column 7, line 6, delete "mixes" and substitute therefor --mix's--.

Column 9, line 6, delete "polygonal." and substitute therefor --polygon.---.

Column 11, line 46, delete "effecting" and substitute therefor --affecting--.

Column 12, line 22, delete "104" and substitute therefor ---$10^4$--.

Column 12, line 23, delete "106" and substitute therefor --$10^6$--.

Column 12, lines 29-30, delete "prod-uct to" and substitute therefor --product is to--.

UNITED STATES PATENT AND TRADEMARK OFFICE
CERTIFICATE OF CORRECTION

PATENT NO. : 4,959,240

DATED : September 25, 1940

INVENTOR(S) : Aulik et al.

It is certified that error appears in the above-identified patent and that said Letters Patent is hereby corrected as shown below:

Column 12, line 32, delete "section that" and substitute therefor --section, that--.

Column 13, line 31, delete "convention" and substitute therefor --conventional--.

Column 13, line 37, delete "typical" and substitute therefore --typically--.

Column 13, line 38, delete "preferredly" and substitute therefor --preferably--.

Column 13, line 54, delete "convention" and substitute therefor --conventional--.

Column 13, line 64, delete "preferredly" and substitute therefor --preferably---.

Column 13, line 65, delete "preferredly" and substitute therefor --preferably--.

Column 14, line 51, delete "differential flow" and substitute therefor --differential, the flow--.

UNITED STATES PATENT AND TRADEMARK OFFICE
CERTIFICATE OF CORRECTION

PATENT NO. : 4,959,240

DATED : September 25, 1990

INVENTOR(S) : Aulik et al.

It is certified that error appears in the above-identified patent and that said Letters Patent is hereby corrected as shown below:

Column 14, line 52, delete "and in" and substitute therefor --and the flow in--.

Column 16, line 54, delete "fry" and substitute therefor -- dry--.

Column 17, line 67, delete "is" and substitute therefor --are--.

Column 18, lines 5-6, delete "con-tinuing" and substitute therefor --containing--.

Column 18, line 22, delete "which" and substitute therefor --which was--.

Column 18, line 23, delete "approximately" and substitute therefore --(approximately--.

Column 20, line 12, delete "(c)".

Signed and Sealed this

Twenty-fourth Day of December, 1991

Attest:

HARRY F. MANBECK, JR.

*Attesting Officer*  *Commissioner of Patents and Trademarks*